United States Patent
Albrecht et al.

(10) Patent No.: US 9,293,273 B2
(45) Date of Patent: Mar. 22, 2016

(54) TAP CHANGER WITH VACUUM INTERRUPTERS

(75) Inventors: Wolfgang Albrecht, Wenzenbach (DE); Christian Hammer, Regensburg (DE); Christoph Heynen, Wenzenbach (DE); Rainer Frotscher, Wenzenbach (DE); Christian Kotz, Schorndorf (DE); Andreas Sachsenhauser, Mallersdorf-Pfaffenberg (DE); Christian Pircher, Lappersdorf (DE); Werner Hartmann, Weisendorf (DE); Sylvio Kosse, Erlangen (DE); Andreas Lawall, Berlin (DE); Astrid Renz, legal representative, Berlin (DE); Roman Renz, Berlin (DE); Andreas Stelzer, Berlin (DE); Joerg Teichmann, Alzenau (DE); Norbert Wenzel, Erlangen (DE)

(73) Assignees: MASCHINENFABRIK REINHAUSEN GMBH, Regensburg (DE); SIEMENS AG, Munich (DE)

( * ) Notice: Subject to any disclaimer, the term of this patent is extended or adjusted under 35 U.S.C. 154(b) by 88 days.

(21) Appl. No.: 13/881,607

(22) PCT Filed: Jan. 4, 2012

(86) PCT No.: PCT/EP2012/000016
§ 371 (c)(1),
(2), (4) Date: Sep. 25, 2013

(87) PCT Pub. No.: WO2012/097957
PCT Pub. Date: Jul. 26, 2012

(65) Prior Publication Data
US 2014/0027257 A1  Jan. 30, 2014

(30) Foreign Application Priority Data
Jan. 19, 2011 (DE) .......................... 10 2011 008 959

(51) Int. Cl.
| | |
|---|---|
| *H01H 9/00* | (2006.01) |
| *H01H 33/16* | (2006.01) |
| *H01H 33/662* | (2006.01) |
| *H01H 33/664* | (2006.01) |
| *H02P 13/06* | (2006.01) |
| *H01F 29/04* | (2006.01) |

(52) U.S. Cl.
CPC ............. *H01H 9/0038* (2013.01); *H01F 29/04* (2013.01); *H01H 9/0027* (2013.01); *H01H 33/16* (2013.01); *H01H 33/6647* (2013.01); *H01H 33/66207* (2013.01); *H02P 13/06* (2013.01)

(58) Field of Classification Search
CPC ............ H01H 33/664; H01H 33/6647; H01H 9/0038; H01H 9/40; H01H 2033/66276; H01H 2033/66292; H01H 9/005; H01H 9/0016; H01H 9/0027
USPC ............ 218/118, 67, 123, 136, 154; 200/5 R, 200/10, 11 TC
See application file for complete search history.

(56) References Cited

U.S. PATENT DOCUMENTS

| | | | | |
|---|---|---|---|---|
| 3,405,245 | A | * 10/1968 | Ito et al. ................. | 218/126 |
| 6,720,515 | B2 | * 4/2004 | Renz et al. ................. | 218/136 |
| 2008/0245772 | A1 | * 10/2008 | Anger et al. ................. | 218/134 |

FOREIGN PATENT DOCUMENTS

| | | |
|---|---|---|
| DE | 2021575 A | 12/1971 |
| DE | 3344376 A | 6/1985 |
| DE | 19756308 B | 3/1999 |
| DE | 102007004530 A | 9/2007 |
| DE | 102006033422 B | 11/2007 |
| EP | 0258614 A | 3/1988 |

OTHER PUBLICATIONS

Machine translation of cited document, Burghauser et al. DE102006033422 attached.*
Machine translation of JP2003-297648 (orig. doc. published Oct. 17, 2003).*

* cited by examiner

Primary Examiner — R S Luebke
Assistant Examiner — William Bolton
(74) Attorney, Agent, or Firm — Andrew Wilford

(57) ABSTRACT

The invention relates to a tap changer having vacuum interrupters for switching over between winding taps of a tapped transformer without interruption. The tap changer according to the invention having vacuum interrupters is based on the general idea of combining the functionalities of at least one conventional vacuum switching contact which switches under load and a further mechanical switching means according to the prior art in just one single vacuum interrupter with two separately moving contact systems.

3 Claims, 4 Drawing Sheets

TAP CHANGER WITH VACUUM INTERRUPTERS

CROSS REFERENCE TO RELATED APPLICATIONS

This application is the US-national stage of PCT application 4 Jan. 2012 filed PCT/EP2012/000016 and claiming the priority of German patent application 102011008959.4 itself filed 19 Jan. 2011.

FIELD OF THE INVENTION

The invention relates to a tap changer with vacuum-switching tubes for uninterrupted changeover between winding taps of a tapped transformer.

BACKGROUND OF THE INVENTION

A tap changer is known from DE 20 21 575 that comprises, in total, four vacuum-switching tubes per phase. Provided in each of the two load branches are a respective vacuum-switching tube as a main contact and a respective further vacuum-switching tube, connected in series with a switching resistor, as a contact resistor.

When uninterrupted load changeover from the previous winding tap n to a new, preselected winding tap n+1 takes place initially the main contact of the side switching off is opened and thereupon the contact resistor of the side taking over closes so that a compensating current limited by the switch-over resistors flows between the two taps n and n+1.

After the previously closed contact resistor of the side switching off has opened, the main contact of the side taking over then closes so that the entire load current is conducted from the new winding tap n+1 to the load diverter; the changeover is concluded.

However, in various cases of use such known tap changers with vacuum-switching tubes for regulation of power transformers a high surge voltage strength, up to 100 kV and significantly above that, is required. Such undesired surge voltages, the level of which is substantially dependent on the construction of the tapped transformer and the winding parts between the individual tap stages, are on the one hand lightning surge voltages that result from lightning strikes in the mains. On the other hand, switching surge voltages caused by unpredictable switching surges in the mains to be regulated can also occur.

In the case of insufficient surge voltage resistor of the tap changer a temporary tap short circuit or an undesired breakthrough at the ceramic member or the attenuating screen of vacuum-switching tubes in the load branch not conducting the load current can happen that not only can cause long-term damage thereof, but in general is undesired.

This leads in many cases in the design of the switching paths and thus particularly also of the vacuum-switching tubes to over-dimensioning so that these reliably withstand the described voltage loading. Not only the small constructional space currently available with modern apparatus, but also the economics as well as serviceability of such vacuum-switching tubes cause such over-dimensioning to appear disadvantageous.

A tap changer is proposed in DE 10 2010 024 255 (not prior-published) in which a first winding tap of a first main current branch is connected with a load diverter by way of a series connection consisting of a first mechanical changeover switch and a first switching means, i.e. a vacuum-switching tube or alternatively a semiconductor component. In a symmetrical form of construction analogous thereto a second winding tap of the second main current branch is similarly connected with the load diverter by way of a series connection consisting of a second mechanical changeover switch and a second switching means, i.e. a second vacuum-switching tube or alternatively a second semiconductor component. Moreover, a first auxiliary current branch with an included resistor is branched off between the first winding tap and the first mechanical changeover switch, by means of which an electrical connection with the second mechanical changeover switch of the second main current branch is producible, and a second auxiliary current branch with a further included resistor is branched off between the second winding tap and the second mechanical changeover switch, by means of which an electrical connection with the first mechanical changeover switch of the first main current branch is producible.

In other words: a mechanical changeover switch that is connected in series with the respective vacuum-switching tube and that ensures complete electrical separation of the respective unconnected winding tap and thus a high surge voltage resistor, is present in the known tap changer in each main and auxiliary current branch.

All tap changers known from the prior art require several vacuum-switching tubes and additional mechanical switching elements per phase that due to the large amount of space required by the individual switching means and the accompanying constructional mechanical outlay is disadvantageous and, above all, costly. Not least this is also because for a changeover process a plurality of requisite individual components is needed in the tap changer for switching sequence realization that then have to interengage within a few tenths of a second in a changeover process precisely defined in terms of time.

OBJECT OF THE INVENTION

It is therefore the object of the present invention to indicate a tap changer with vacuum-switching tubes for uninterrupted changeover between winding taps of a tapped transformer, which enables reduction in the complexity and the required individual components, in that case, in particular, makes mechanical switching means redundant and in addition, however, has a high surge voltage resistor.

SUMMARY OF THE INVENTION

This object is fulfilled by a tap changer with vacuum-switching tubes on the general idea of combining into only one single vacuum-switching tube with two separate movable contact systems the functionalities of at least one conventional vacuum switching contact switching under load and a further mechanical switching means according to the prior art. In other words: In the tap changer according to the invention the at least two previously separate required switching means, namely the at least one vacuum-switching tube switching under load and the further mechanical switching means, are no longer constructed—as in accordance with the prior art—as individual subassemblies and separately incorporated in the tap changer, but are combined into only a single vacuum-switching tube with two vacuum switching contacts. The mechanical switching means, which in the tap changer according to the invention is now an integral component of the vacuum-switching tube, can in that case act not only as a simple on/off switch, but also as a changeover switch.

According to a preferred form of embodiment of the invention the switching chambers of the vacuum-switching tube for the vacuum switching contact switching under load and the further vacuum switching contact switching without load, which functionally replaces the previous mechanical switching means, are respectively arranged in a separate vacuum chamber of mutually sealed construction. The constant dielectric strength of the vacuum chamber, the vacuum switching contact replacing the mechanical switching means, is thus guaranteed, since no metal, which occurs as a consequence of changing over carried out under load, can deposit in this vacuum chamber at the insulating paths.

Vacuum-switching tubes with two contact positions are already known per se.

DE 3344367 relates to a vacuum-switching tube with two contact pairs that are connected in series and actuatable simultaneously, in a single vacuum chamber.

DE 197 56 308 C1 relates to a similar vacuum-switching tube with two switching paths arranged on a common axis, wherein internally disposed contact compression springs are provided.

EP 0 258 614 B1 describes the combination of a vacuum-switching tube and a specific electrical connection at a tap changer. In this case, several switching paths are arranged in a vacuum chamber, which causes a complicated construction of the vacuum-switching tube annular fixed contacts.

Finally, DE 10 2006 033 422 B3 describes a further vacuum-switching tube with multiple functionalities, wherein here as well not only annular fixed contacts, but also internally disposed contact compressions springs are required.

BRIEF DESCRIPTION OF THE DRAWING

The invention will be explained in still more detail by way of example in the following on the basis of figures, in which.

SPECIFIC DESCRIPTION OF THE INVENTION

Figure 1:
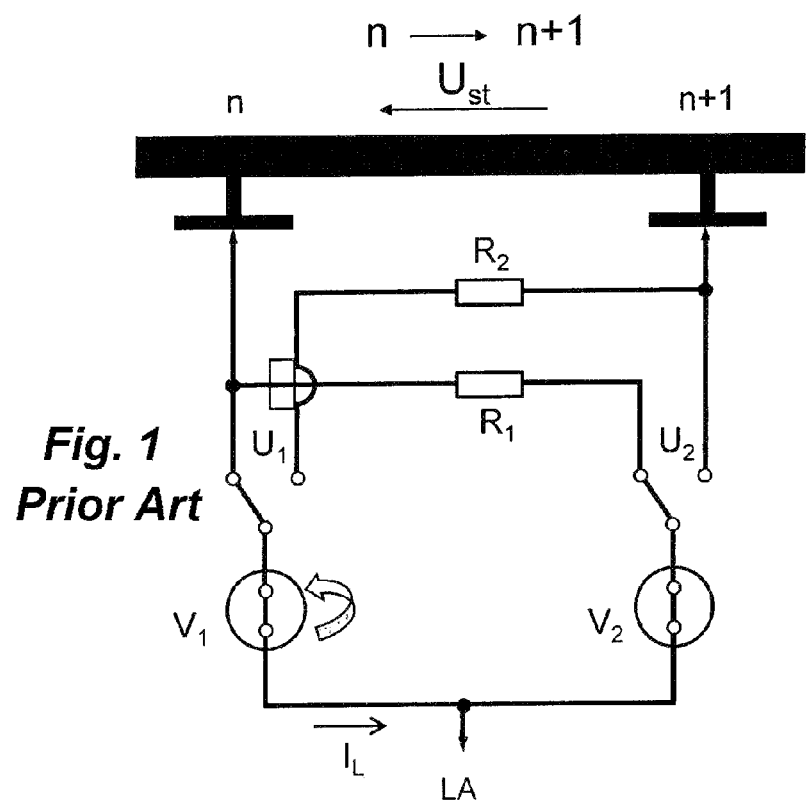
FIG. 1 shows a tap changer according to the prior art.

A tap changer known from the prior art is illustrated in FIG. 1. The selector of the tap changer, which prior to the actual load changeover undertakes power-free selection of the new winding tap—here n+1—to be switched over to, is not shown. The load changeover switch has two load branches A and B that are respectively electrically connected with a winding tap n or n+1. The tap changer has a main current branch and an auxiliary current branch in each load branch.

The first main current branch produces an electrical connection from the winding tap n via a mechanical changeover switch $U_1$ and a vacuum-switching tube $V_1$, which is connected in series therewith, to the load diverter LA. In a symmetrical mode of construction analogous thereto the second main current branch similarly produces an electrical connection from the winding tap n via a mechanical changeover switch $U_2$, which is connected in series, and a vacuum-switching tube $V_2$ to the load diverter LA.

A first auxiliary current branch with an included resistor $R_1$ is branched off between the winding tap n and the mechanical changeover switch $U_1$ of the first main current branch, by means of which auxiliary current branch an electrical connection with the mechanical changeover switch $U_2$ of the second main current branch is producible. In a further mode of construction analogous thereto a second auxiliary current branch with an included resistor $R_2$ is branched off between the winding tap n+1 and the mechanical changeover switch $U_2$ of the second main current branch, by means of which auxiliary current branch an electrical connection with the mechanical changeover switch $U_1$ of the first main current branch is producible. Depending on the setting of the respective switching means the first auxiliary current branch can thus produce an electrically conductive connection from the winding tap n via the resistor $R_1$ and the switching means connected in series therewith, namely the mechanical changeover switch $U_2$ and the vacuum-switching tube $V_2$, to the load diverter LA, and the second auxiliary current branch from the winding tap n+1 via the resistor $R_2$ and the switching means connected in series therewith, namely the mechanical changeover switch $U_1$ and the vacuum-switching tube $V_1$.

The stationary operation of the electrically connected winding tap n is shown in FIG. 1, in which the load current flows from the winding tap n via the mechanical changeover switch $U_1$ and the closed vacuum-switching tube $V_1$ directly to the load diverter LA. Since the current selects the path of the lowest internal conduction resistance, only a negligibly small proportion of the load current flows from the winding tap n via the branched-off first auxiliary current branch to the load diverter LA.

Figure 2:
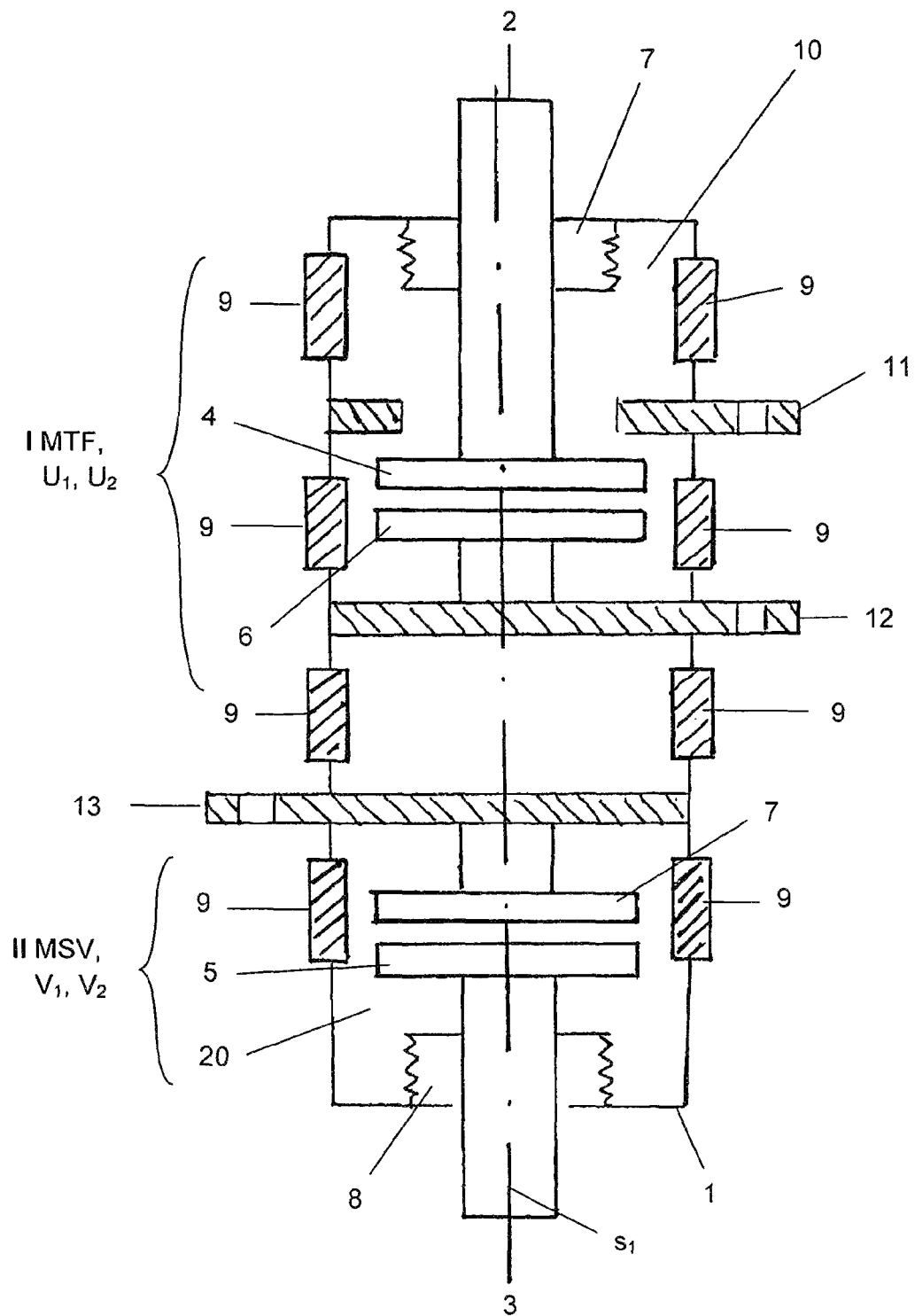
FIG. 2 shows a vacuum-switching tube according to the invention for a tap changer, in a schematic illustration.

FIG. 2 shows a vacuum-switching tube according to the invention. It comprises two separate contact systems 1 and 11 arranged in separate vacuum chambers 10 and 20, wherein the contact system 1 realizes a mechanical changeover switch denoted in FIG. 1 by $U_1$ or $U_2$ and the contact system 11 realizes a vacuum-switching tube denoted in FIG. 1 by $V_1$ or $V_2$. In that case, a common housing 1 enclosing the entire vacuum-switching tube is provided. Provided centrally in the rotationally symmetrical longitudinal axis $s_1$ is an upper, movable plunger 2 and, at the opposite end, a lower, movable plunger 3 that in the interior of the housing 1 carry contact members 4 and 5 in a manner known per se. The two contact members 4 and 5 can be brought into electrical connection with a corresponding fixed contact 6 or 7 separately and independently of one another by actuation of the respective plunger 2 or 3. On the side opposite the fixed contact 6 only the movable contact 4 can be brought into connection with a further contact 11. In addition, the upper fixed contact 6 is electrically connected with a first upper plate 12 and the lower fixed contact 7 with a second lower plate 13. The two plates 12 and 13 project in such a manner beyond the side wall of the housing 1 that electrical terminals can be mounted thereat. The known contact springs that co-operate with the plungers 2 and 3, are, for reasons of clarity, not illustrated here. However, an upper bellows 7 and a lower bellows 8, which can be of the same or also different construction, are illustrated. In addition, several insulating ceramic members 9 are also illustrated here.

With the vacuum-switching tube according to the invention in the contact system 1, a mechanical changeover switch is thus functionally replaced by a vacuum switching contact that switches without load. If the described vacuum-switching tube is mirrored on a tap changer of FIG. 1, then according to the invention the two previously separate switching elements $V_1$ and $U_1$ or $V_2$ and $U_2$ are now combined in a single vacuum-switching tube with the separately controllable contact systems 1 and 11. If an electrically conductive connection is created of the contact 11 of the vacuum-switching tube according to the invention via a resistor $R_2$ with the winding tap n+1, the upper electrically conductive plate 12 with the winding tap n, the lower electrically conductive plate 13 with the load diverter LA and between the lower plate 13 and the upper plunger 2 then the tap changer described in FIG. 1 can thereby be mechanically realized in particularly simple manner.

Figure 3:
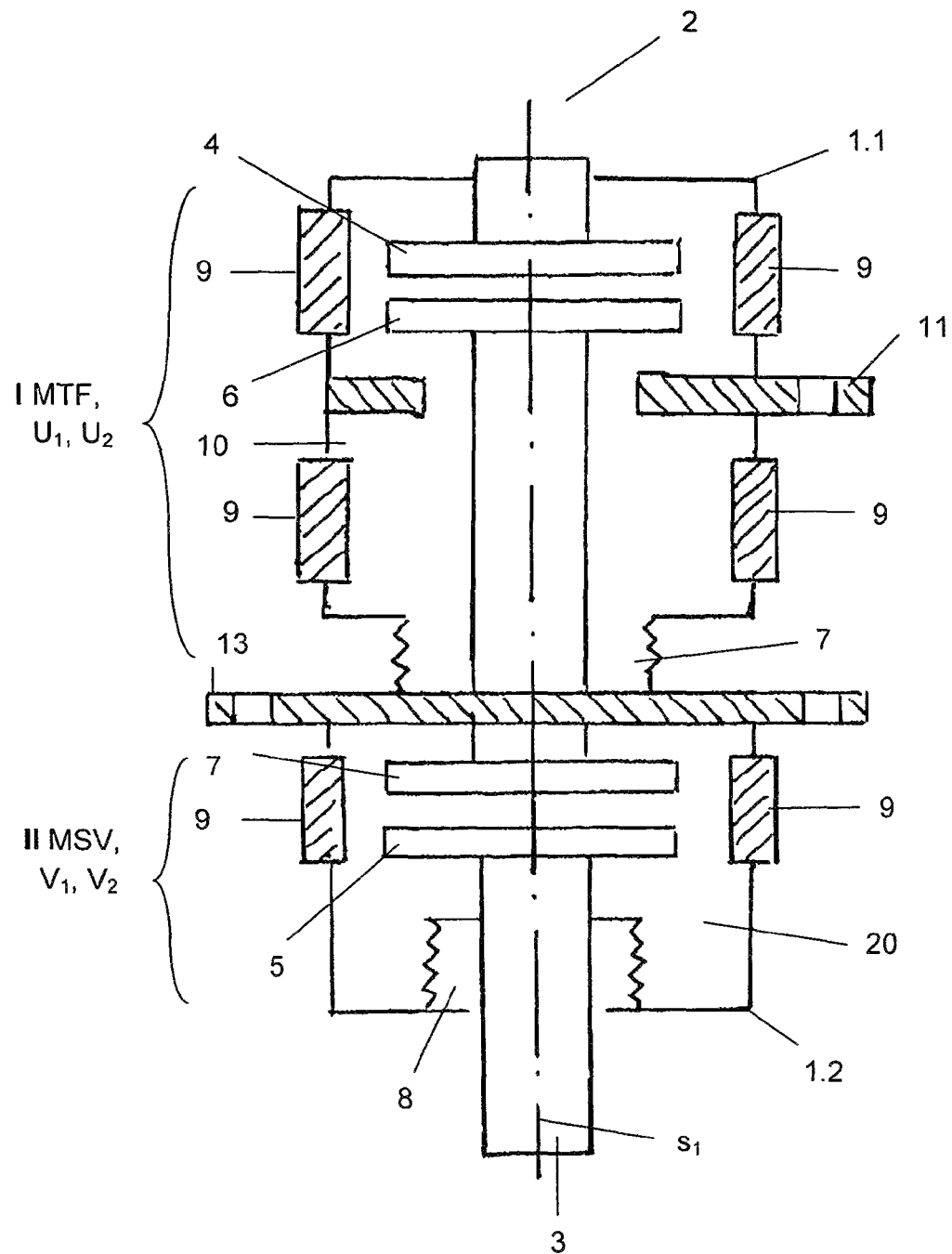
FIG. 3 shows an embodiment of a vacuum-switching tube according to the invention for a tap changer, in a schematic form of embodiment.

A first form of embodiment of a vacuum-switching tube according to the invention is shown in FIG. 3. In departure from FIG. 2, in the form of embodiment of FIG. 3 the enclosing housing 1 is of two-part construction in such a manner that the contact system 1 is enclosed by a first housing part 1.1 and the contact system 11 by a second housing part 2.2. The upper plunger 2 is in that case fixedly connected with the first housing part 1.1 so that a movement of the plunger 2 executed along the axis $s_1$ of symmetry can thereby be transmitted to the first housing part 1.1 and in the case of a corresponding switching setting the upper fixed contact 6 is electrically connectable with either the contact 11 or the movable contact member 4. In addition, the upper fixed contact 6 and the lower fixed contact 7 are in constant electrical connection with one another.

In the case of this form of embodiment, as well, with the vacuum-switching tube according to the invention in the contact system 1 a mechanical changeover switch is functionally replaced by a vacuum switching contact that switches without load. If the contact 11 of the vacuum-switching tube according to the invention is connected with the winding tap n, the upper plunger 2 via a resistor $R_2$ with the winding tap n+1 and the lower plunger 3 with the load diverter LA then the tap changer described in FIG. 1 can thereby be mechanically realized in particularly simple manner.

Figure 4:
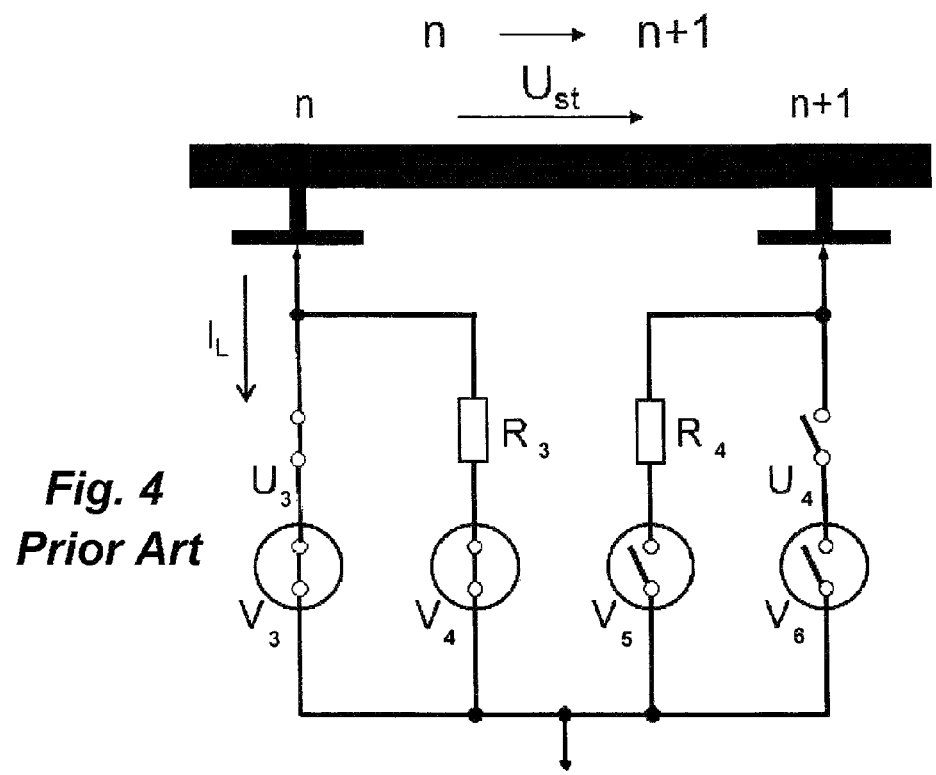
FIG. 4 shows a further tap changer known from the prior art.

A further tap changer known from the prior art is shown in FIG. 4. It has a first load branch in which a vacuum-switching tube $V_3$ acting as a main contact and a mechanical changeover switch $U_3$ connected in series therewith as well as a switch-over resistor $R_3$ parallel thereto and a vacuum-switching tube $V_4$ acting as a contact resistor are present. The second load branch comprises, in entirely analogous manner, a vacuum-switching tube $V_6$ and a mechanical changeover switch $U_4$ connected in series therewith as well as parallel thereto a further switch-over resistor $R_4$ and a vacuum-switching tube $V_5$.

Figure 5:
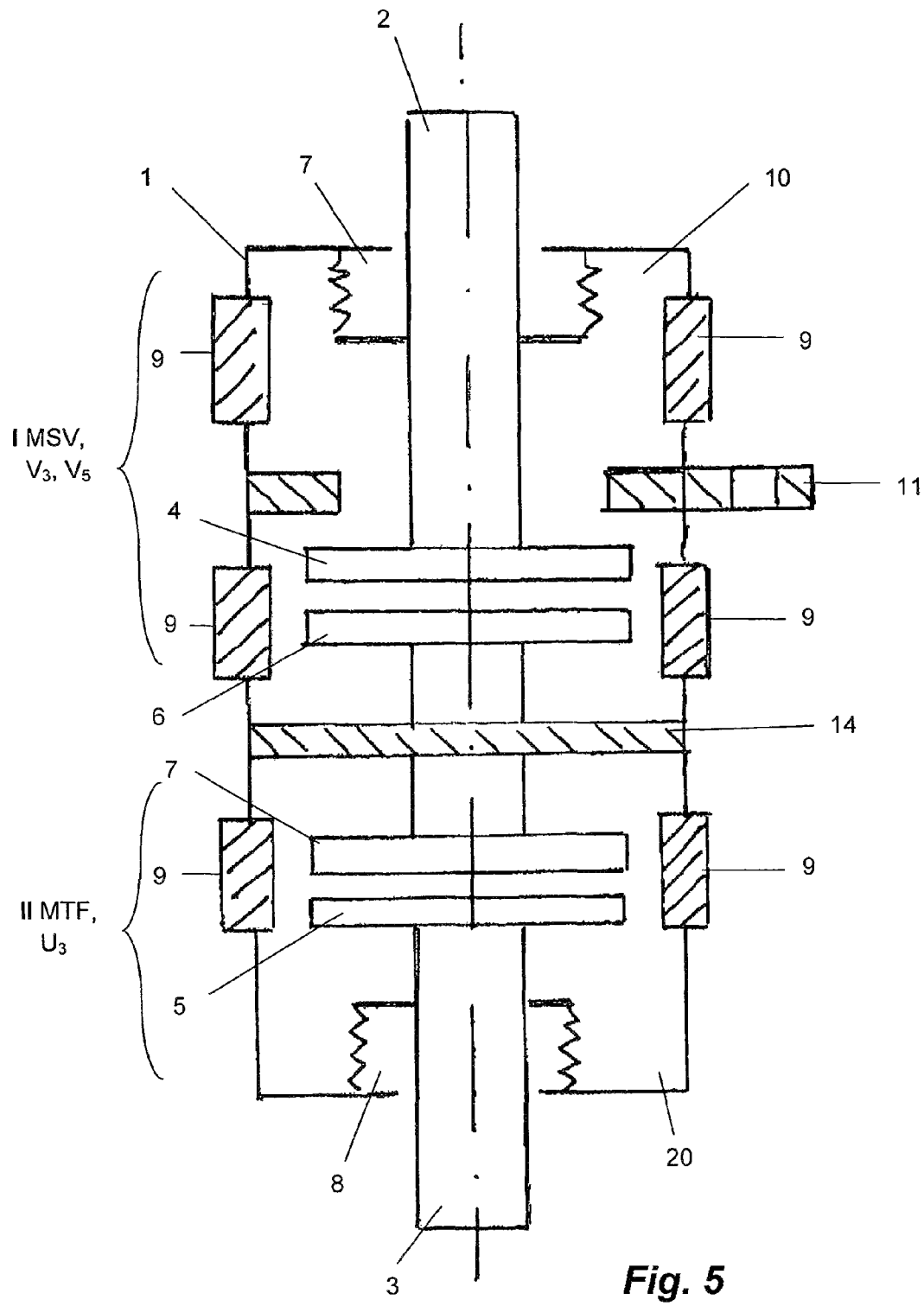
FIG. 5 shows a further embodiment of a vacuum-switching tube according to the invention for a tap changer.

FIG. 5 shows yet a further form of embodiment of a vacuum-switching tube, in which the contact system 1 functionally replaces the two vacuum-switching tubes $V_3$ and $V_5$ or $V_6$ and $V_4$ of the tap changer of FIG. 4 and the contact system 11 forms the respectively associated changeover switch $U_3$ or $U_4$. This form of embodiment also comprises two physically separate vacuum chambers 10 and 20 that receive the respective contact system 1 or 11. In that case, a common housing 1 enclosing the entire vacuum-switching tube is provided. Provided centrally in the rotationally symmetrical longitudinal axis $s_1$ is an upper, movable plunger 2 and, at the opposite end, a lower, movable plunger 3 that in the interior of the housing 1 carry contact members 4 and 5 in a manner known per se. The two contact members 4 and 5 can be brought into electrical connection with a corresponding fixed contact 6 or 7 separately and independently of one another by actuation of the respective plunger 2 or 3. On the side opposite the fixed contact 6 the movable contact 4 can be brought into connection with a further contact 11, so that the movable contact 4 can thus electrically co-operate with either the fixed contact 6 or the further contact 11. In addition, the upper fixed contact 6 and the lower fixed contact 7 are in electrical connection. Arranged therebetween is a metallic plate 14 that separates the two vacuum chambers 10 and 20 from one another. The known contact springs, which co-operate with the plungers 2 and 3, are here, for reasons of clarity, not illustrated. However, an upper bellows 7 and a lower bellows 8, which can be of the same or also different construction, are illustrated. In addition, several insulating ceramic members 9 are illustrated here.

If the vacuum-switching tube described in FIG. 5 is mirrored on a tap changer of FIG. 4, then according to the invention the two previously separate switching elements $V_3$, $V_5$ and $U_3$ or $V_6$, $V_4$ are now combined in a single vacuum-switching tube with the separately controllable contact systems 1 and 11. If the contact 11 of the vacuum-switching tube illustrated in FIG. 5 is electrically conductively connected by way of a resistor $R_4$ with the winding tap n+1, the upper plunger 2 with the load diverter LA and the lower plunger 3 with the winding tap n then the tap changer described in FIG. 4 can be mechanically realized in particularly simple manner.

The invention claimed is:

1. A tap changer for uninterrupted changeover between winding taps of a tapped transformer, the tap changer comprising:
    two load branches for each phase to be switched and each having
        a main current branch having
            a vacuum switch that acts as a main switch and
            a mechanical switch connected therewith in series,
        a respective auxiliary current branch connected in parallel with the respective main branch and having in the current-conducting state
            at least one switch-over resistor and, in series therewith,
            a vacuum switch acting as an auxiliary switch;
    a common load diverter connectable not only with the main current branch but also with the auxiliary current branch of each load branch; and
    a single vacuum-switching tube holding first and second movable contact systems forming at least one of the vacuum switches of the main or auxiliary current branch and one of the mechanical switches.

2. The tap changer according to claim 1, wherein the first contact system forms the mechanical switch and the second contact system forms the vacuum switch.

3. The tap changer according to claim 1, wherein the first contact system comprises the two vacuum switches and the second contact system forms a mechanical switch.

* * * * *